United States Patent
Li et al.

(10) Patent No.: US 8,866,359 B2
(45) Date of Patent: Oct. 21, 2014

(54) BRUSHLESS MOTOR HAVING V-SHAPED PERMANENT MAGNETS

(75) Inventors: Yue Li, Hong Kong (CN); Jian Zhao, Shenzhen (CN); Yong Wang, Shenzhen (CN); Ya Ming Zhang, Shenzhen (CN); Yan Hong Xue, Hong Kong (CN); Mao Xiong Jiang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 281 days.

(21) Appl. No.: 13/149,603

(22) Filed: May 31, 2011

(65) Prior Publication Data
US 2011/0291515 A1 Dec. 1, 2011

(30) Foreign Application Priority Data

May 31, 2010 (CN) .......................... 2010 1 0190780

(51) Int. Cl.
| | | |
|---|---|---|
| *H02K 1/27* | (2006.01) | |
| *H02K 21/16* | (2006.01) | |
| *H02K 1/14* | (2006.01) | |
| *H02K 21/14* | (2006.01) | |

(52) U.S. Cl.
CPC ............ *H02K 21/16* (2013.01); *H02K 2213/03* (2013.01); *H02K 1/276* (2013.01); *H02K 1/2766* (2013.01)
USPC .................................. 310/156.53; 310/156.45

(58) Field of Classification Search
CPC ......... H02K 1/27; H02K 21/12; H02K 21/14; H02K 21/16; H02K 1/14
USPC ............. 310/156.53, 156.45, 156.44, 156.46, 310/156.56, 216.097
See application file for complete search history.

(56) References Cited

U.S. PATENT DOCUMENTS

| | | | |
|---|---|---|---|
| 5,990,592 A * | 11/1999 | Miura et al. | ............. 310/156.53 |
| 6,133,662 A | 10/2000 | Matsunobu | |
| 6,429,565 B1 | 8/2002 | Matsunobu | |
| 6,815,858 B2 | 11/2004 | Matsunobu | |
| 6,979,924 B2 | 12/2005 | Nishiyama | |
| 7,151,335 B2 | 12/2006 | Tajima | |
| 7,230,359 B2 | 6/2007 | Iles-Klumpner | |
| 7,288,868 B2 * | 10/2007 | Tamaki et al. | ............ 310/156.53 |
| 7,474,029 B2 | 1/2009 | Rahman | |
| 7,521,832 B2 | 4/2009 | Tajima et al. | |
| 7,719,153 B2 * | 5/2010 | Hsu | .......................... 310/156.58 |
| 2002/0036438 A1 * | 3/2002 | Nishiyama et al. | ....... 310/156.53 |
| 2002/0074887 A1 * | 6/2002 | Takano et al. | ............. 310/156.53 |
| 2009/0127961 A1 * | 5/2009 | Pedersen et al. | ......... 310/156.53 |
| 2009/0236923 A1 * | 9/2009 | Sakai et al. | ............... 310/156.43 |
| 2010/0060223 A1 * | 3/2010 | Sakai et al. | ............... 310/156.01 |
| 2010/0079026 A1 * | 4/2010 | Han et al. | ................. 310/156.53 |

\* cited by examiner

*Primary Examiner* — Michael Andrews
(74) *Attorney, Agent, or Firm* — Muncy, Geissler, Olds & Lowe, P.C.

(57) ABSTRACT

A brushless motor has a stator and a rotor. The stator has a stator core with a plurality of inwardly extending salient poles and windings wound about the salient poles. The rotor has a shaft, a rotor core fixed onto the shaft, and magnets inserted in the rotor core for forming magnetic poles of the rotor. Each of the salient poles has a pole shoe with a pole face that extends along a circumferential direction confronting the rotor core and being spaced from the rotor core by an air gap. In a radial cross section of the motor, each of the magnetic poles of the rotor has an effective dimension (W) which is about 0.85 times to 1.2 times of the chord length (L) of each pole face.

12 Claims, 5 Drawing Sheets

US 8,866,359 B2

BRUSHLESS MOTOR HAVING V-SHAPED PERMANENT MAGNETS

CROSS REFERENCE TO RELATED APPLICATIONS

This non-provisional patent application claims priority under 35 U.S.C. §119(a) from Patent Application No. 201010190780.2 filed in The People's Republic of China on May 31, 2010.

FIELD OF THE INVENTION

This invention relates to an electric motor, and in particular to a brushless electric motor.

BACKGROUND OF THE INVENTION

A brushless motor comprises a stator and a rotor rotatably mounted with respect to the stator. The stator comprises a stator core having inwardly extending teeth and windings wound about the teeth. The rotor comprises a shaft, a rotor core fixed to the shaft and magnets mounted to the rotor core.

One of the factors affecting the efficiency of a brushless motor is flux leakage. Therefore, there is a desire for reducing flux leakage of a brushless motor.

SUMMARY OF THE INVENTION

Accordingly, in one aspect thereof, the present invention provides a brushless motor, comprising: a stator comprising a stator core and windings, the stator core comprising a plurality of salient poles each of which extends inwardly, the windings being wound about the salient poles; and a rotor comprising a shaft, a rotor core fixed onto the shaft, and magnets fixed in the rotor core for forming magnetic poles; the rotor being rotatably mounted to the stator, wherein each of the salient poles comprising a pole shoe which extends along a circumferential direction of the rotor, each of the pole shoes comprising a pole face confronting the rotor core and being spaced from the rotor core by an air gap; and wherein in a radial cross section of the motor, each of the magnetic poles of the rotor has an effective dimension (W) which is about 0.85 times to 1.2 times of the chord length (L) of each pole face.

Preferably, an interval (D) between two adjacent pole shoes is equal to or larger than three times the radial thickness of the air gap.

Preferably, the windings are concentrated windings.

Preferably, the ratio of the number of salient poles to the number of magnetic poles is 3:2.

Preferably, wherein each of the magnetic poles is formed by one piece of permanent magnet (60) inserted in the rotor core (22).

Alternatively, each of the magnetic poles is formed by two pieces of permanent magnets inserted in the rotor core, and in a cross section of the rotor core the two pieces of permanent magnets forming a "V" which opens outwardly.

Alternatively, each of the magnetic poles is formed by a plurality of permanent magnets inserted in the rotor core, the permanent magnets being arranged at least in an inner layer and an outer layer, the inner layer being closer to the shaft than the outer layer, the permanent magnets arranged in the inner layer being spaced from the permanent magnets arranged in the outer layer.

Preferably, in a cross section of the rotor core, the permanent magnets arranged in the outer layer forms a "V" which opens outwardly.

Preferably, in a cross section of the rotor core, the permanent magnets arranged in the inner layer forms a "V" which open outwardly.

Preferably, for each of the magnetic poles, the outer layer comprising two permanent magnets which forms a "V" in a cross section of the rotor core, and the inner layer comprising three pieces of permanent magnets which forms a "V" in a cross section of the rotor core, both of the two "V" open outwardly.

Preferably, for each of the magnetic poles, two of the permanent magnets arranged in the inner layer are respectively located at each side of the magnetic pole, each of the two permanent magnets being arranged in a radial direction of the rotor core and being used as a mutual magnet shared by two adjacent magnetic poles.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
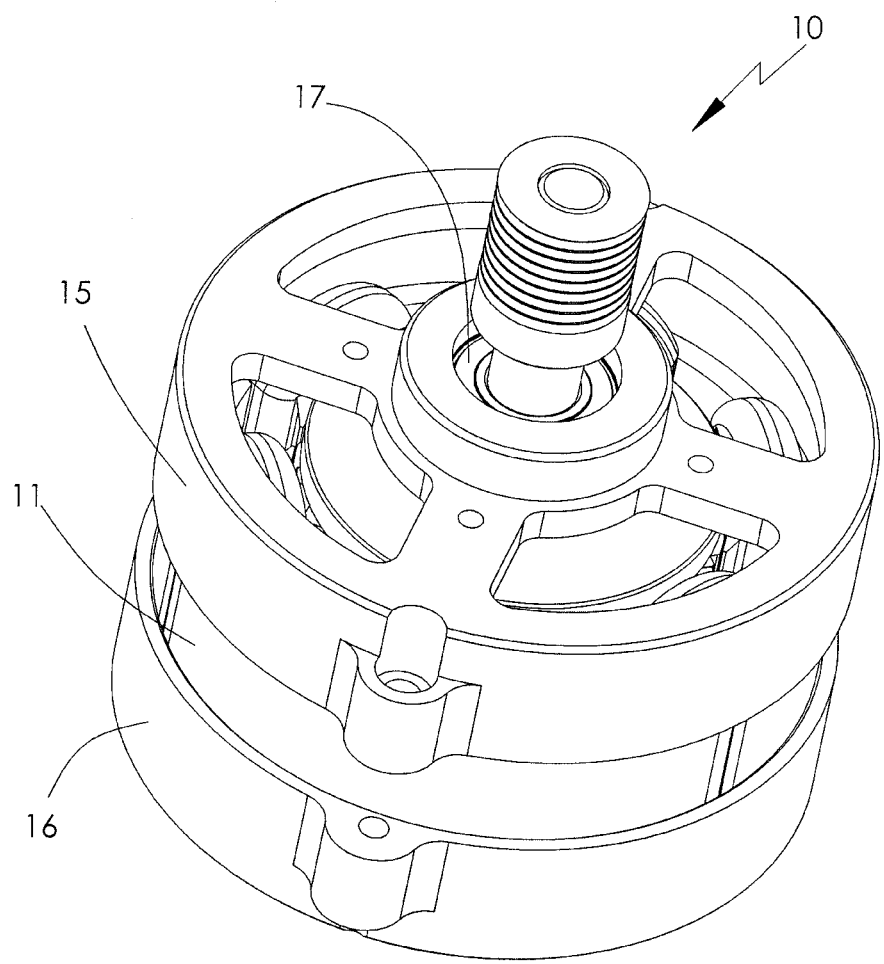
FIG. 1 illustrates a brushless motor according to a preferred embodiment of the present invention.
Figure 2:
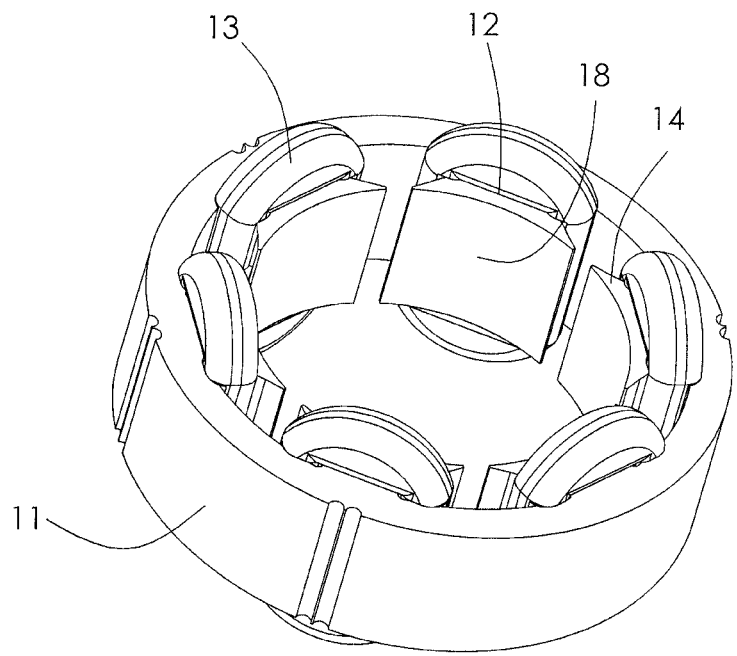
FIG. 2 illustrates a stator core and stator windings of the brushless motor of FIG. 1.
Figure 3:
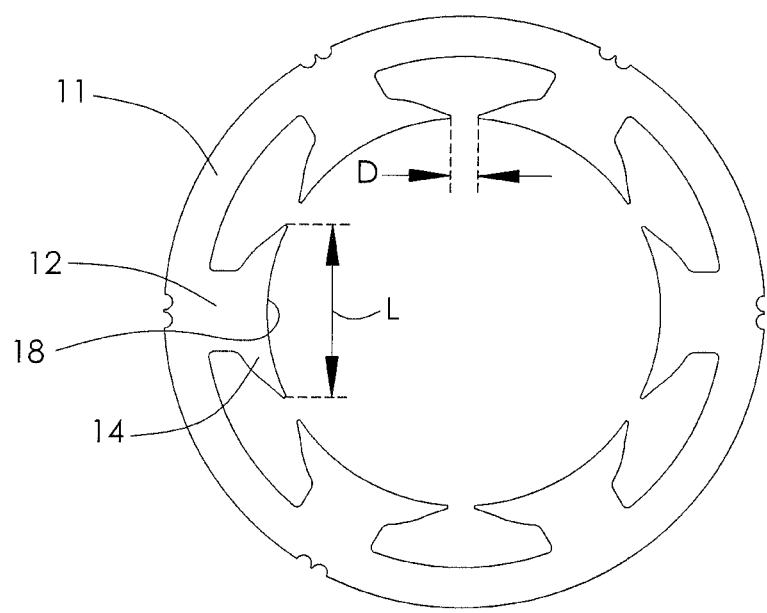
FIG. 3 is a plan view of the stator core of FIG. 2.

FIG. 1 illustrates a brushless motor according to a preferred embodiment of the present invention. The brushless motor comprises a stator and a rotor. FIG. 2 illustrates its stator core and stator windings, and FIG. 3 illustrates the stator core. The stator comprises a stator core 11 having six salient poles 12, stator windings 13 wound about the salient poles, two end caps 15 and 16 mounted to respective axial ends of the stator core 11 and bearings 17 mounted in the end caps.

Figure 4:
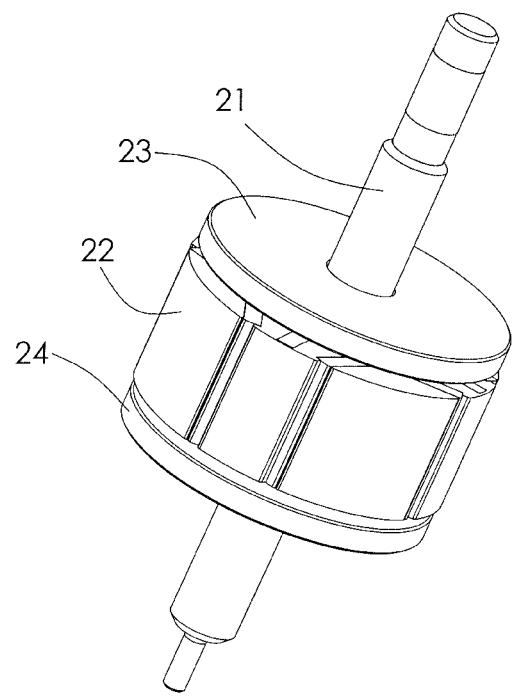
FIG. 4 illustrates a rotor of the brushless motor of FIG. 1.

FIG. 4 illustrates the rotor, which comprises a shaft 21, a rotor core 22 fixed onto the shaft 21, magnets mounted to the rotor core 22 and retaining disks 23, 24. The retaining disks 23, 24 are mounted to respective axial ends of the rotor core 22. The rotor core 22 and the magnets are held between the two retaining disks 23, 24. The shaft 21 is rotatably supported by the bearings 17 with the rotor core 22 confronting stator core 11. An air gap is formed between the rotor core 22 and the stator core 11.

As shown in FIG. 2 and FIG. 3, each salient pole 12 comprises a pole shoe 14 that has a pole face 18 that extends along a circumferential direction of the rotor core 22 and confronts the rotor core 22. The chord length of each pole face is designated as L. The interval between two adjacent pole shoes 14 is designated as D. The stator windings 13 are concentrated windings, comprising six coils each of which is wound about one of the salient poles 12. In concentrated windings, coils do not over lap each other, so that the coils have a shorter axial length and reduced copper wire consumption than traditional lap windings. Therefore, the concentrated windings have a lower resistance than traditional lap windings and a higher efficiency due to the lower resistance.

Figure 5:
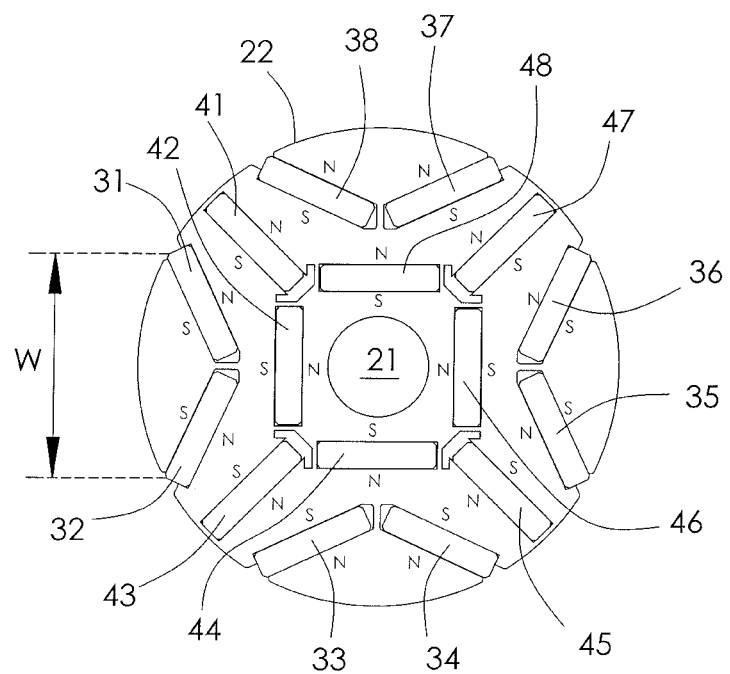
FIG. 5 illustrates a rotor core and magnets of the rotor.

FIG. 5 is an end view of the rotor with the end plates removed to illustrate the rotor core 22 and sixteen magnets 31~38, 41~48. Four magnetic poles are formed in the rotor by the magnets 31~38, 41~48. The four magnetic poles are formed equally spaced about the circumference of the rotor core 22. Specifically, a first magnetic pole is formed by magnets 31, 32, 41, 42 & 43. The five magnets 31, 32, 41, 42, 43 are arranged in two layers: magnets 31 and 32 in an outer layer and magnets 41, 42, 43 in an inner layer. Each of the five magnets is charged in its thickness direction, and their outward sides have a same polarity such as S. Similarly, a second magnetic pole is formed by magnets 33, 34, 43, 44 & 45, and the five magnets are also arranged in two layers. A third magnetic pole is formed by magnets 35, 36 45, 46 & 47, and a fourth magnetic pole is formed by magnets 37, 38 and magnets 47, 48 and 41.

In this embodiment, each magnetic pole is formed by five magnets, with two of the five magnets arranged in an outer layer and the other three magnets in an inner layer. The inner layer is arranged between the rotor shaft 21 and the outer layer. Magnets in the outer layer are separated from magnets in the inner layer. The cross section of the two magnets in the outer layer forms a V which opens outwardly and is substantially bisected by a radius of the rotor core 22. The cross section of the three magnets in the inner layer forms another V which also opens outwardly and is substantially bisected by a radius of the rotor core 22. In the specification and appended claims, the V shape is intended to refer to a shape that looks like "V" or its variants, which can be formed by two or more line sections. In other words, "V" can be formed by two magnets or more than two magnets. Since each magnetic pole is formed by two layers of magnets, the magnetic flux leakage is reduced and motor performance is increased. Furthermore, reluctance torque is increased due to increased axis inductance (Ld).

As shown in FIG. 5, for each magnetic pole, there are two magnets that are arranged in an inner layer and extend in a radial direction. For example, magnets 41 and 43 are arranged in the inner layer and extend in a radial direction. The two magnets 41, 43 are at respective circumferential edges of the first magnetic pole. Each of the two magnets is used as a mutual magnet shared by two adjacent magnetic poles. Specifically, a magnet 41 is a mutual magnet shared by the fourth magnetic pole and the first magnetic pole. Magnet 43 is a mutual magnet shared by the first magnetic pole and the second magnetic pole. Magnet 45 is a mutual magnet shared by the second magnetic pole and the third magnetic pole. Magnet 47 is a mutual magnet shared by the third magnetic pole and the fourth magnetic pole.

Figure 8:
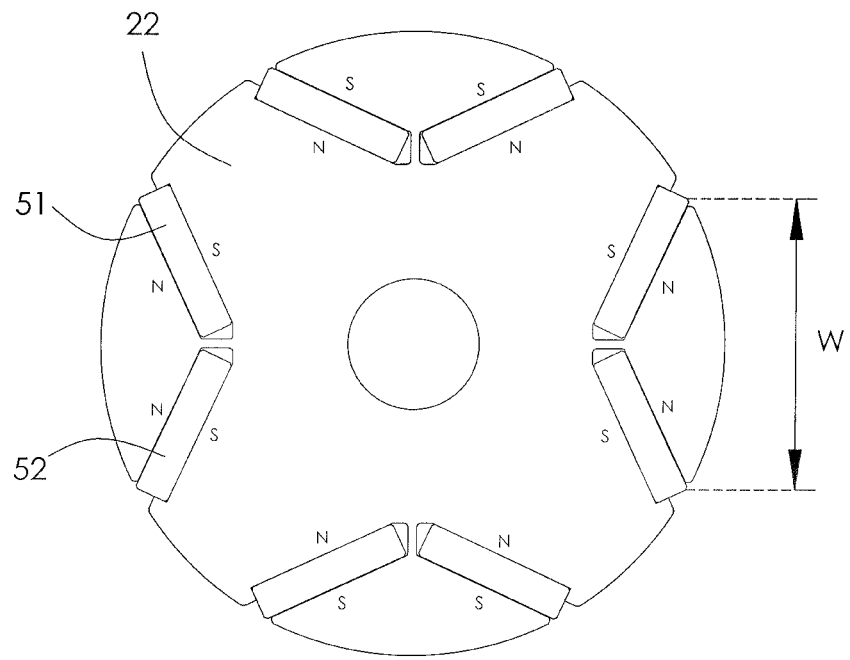
FIG. 8 illustrates a rotor core and magnets of a brushless motor according to a third embodiment of the present invention.

The effective dimension of each magnetic pole is designated as W. For a magnetic pole formed by two or more layers of magnets, effective dimension W of the magnetic pole is defined as the distance between two axially extending edges of the outer layer magnets, and the two axially extending edges is farther away from the rotor shaft than other axially extending edges. For a magnetic pole formed by one layer of magnets (as shown in FIG. 8), effective dimension W is defined as the distance between two axially extending edges of the magnet(s), and the two axially extending edges are farther away from the rotor shaft than other axially extending edges. Effective dimension W of the magnetic pole is equal to 0.85~1.2 times the chord length L of the pole face. Preferably, the effective dimension W is equal to 0.9~1.1 times the chord length L. In this embodiment, the effective dimension W is substantially equal to the chord length L, which will reduce flux leakage.

Figure 6:
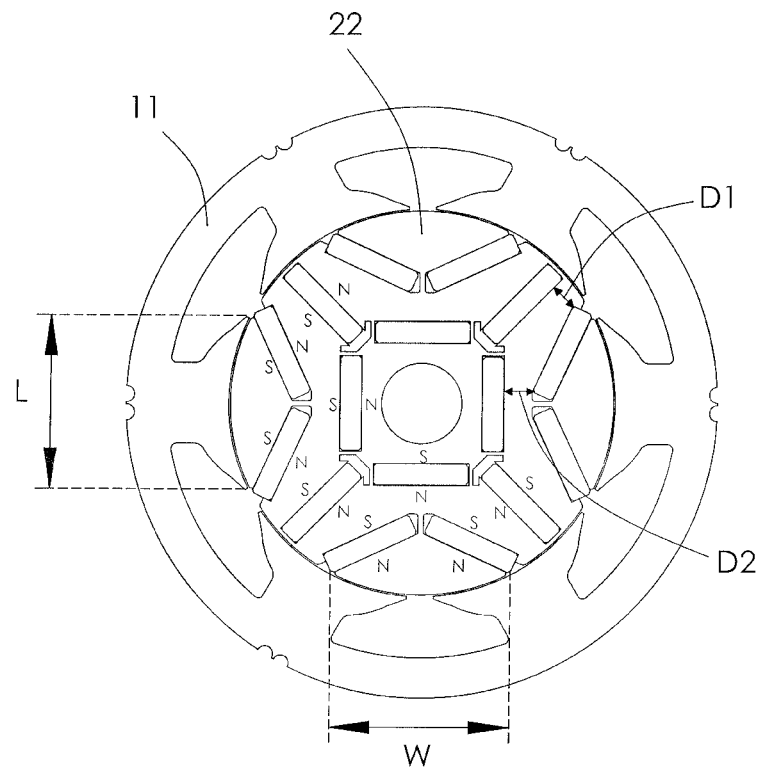
FIG. 6 illustrates the stator core, rotor core and magnets.

FIG. 6 illustrates a cross section of the stator core, rotor core and the magnets. An air gap exists between the rotor core 22 and the stator core 11. The interval D between two adjoining pole shoes 14 is three or more than three times the radial thickness of the air gap. It will be easier for magnetic flux to pass through the air gap rather than the interval D, so that flux leakage is reduced. Furthermore, for each magnetic pole, the distance between the magnets in the outer layer and the magnets in the inner layer varies. In this embodiment, two magnets are arranged in the outer layer, the distance D1 between radially outer ends of the two magnets and the inner layer magnets is the smallest distance, and is substantially equal to the distance D2 between radially inner ends of the two magnets and the inner layer magnets.

Figure 7:
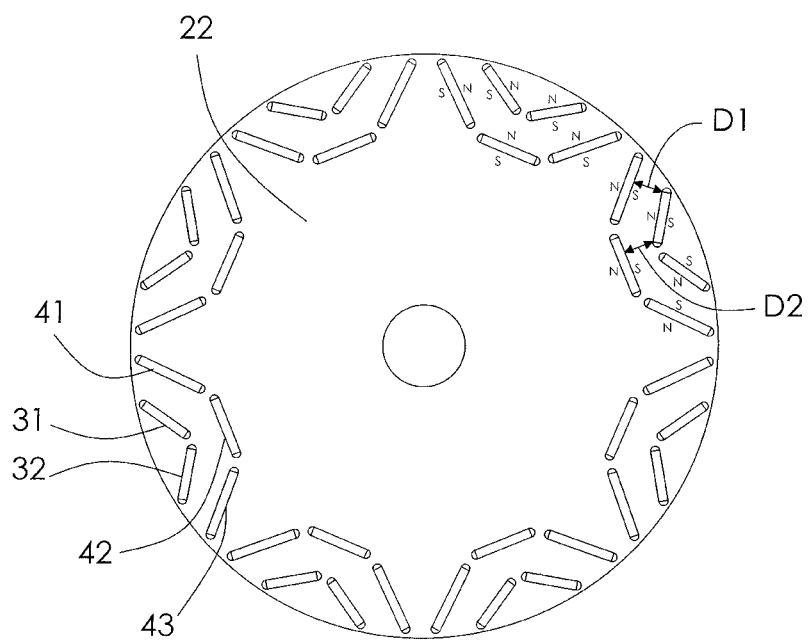
FIG. 7 illustrates a rotor core and magnets of a brushless motor according to a second embodiment of the present invention.

FIG. 7 illustrates a rotor core and magnets of a brushless motor according to another embodiment of the present invention. The rotor comprises eight magnetic poles. Each of the eight magnetic poles is formed by five magnets, two in an outer layer and the other three in an inner layer. For example, one of the eight magnetic poles is formed by magnets 31, 32 and magnets 41~43. The magnets 31 and 32 are arranged in the outer layer and form a "V". The magnets 41~43 are arranged in the inner layer and form another "V". Similarly, for each magnetic pole, the distance between the outer layer magnets and the inner layer magnets varies. In this embodiment, the distance D1 between radially outer ends of the outer layer magnets and the inner layer magnets is the smallest distance, and is substantially equal to the distance D2 between the radially inner ends of the outer layer magnets and the inner layer magnets. In this embodiment, there are no mutual magnets shared by two adjoining magnetic poles.

FIG. 8 illustrates a rotor core of a brushless motor according to a further embodiment. The rotor comprises four magnetic poles, each of which is formed by two magnets 51, 52. For each magnetic pole, the cross section of the two magnets makes a V shape having an outward opening and bisected by a radial line. Effective dimension W of each magnetic pole is defined as the distance between two axially extending edges of the two magnets, and the two axially extending edges are farther away from the rotor shaft than other axially extending edges.

Figure 9:
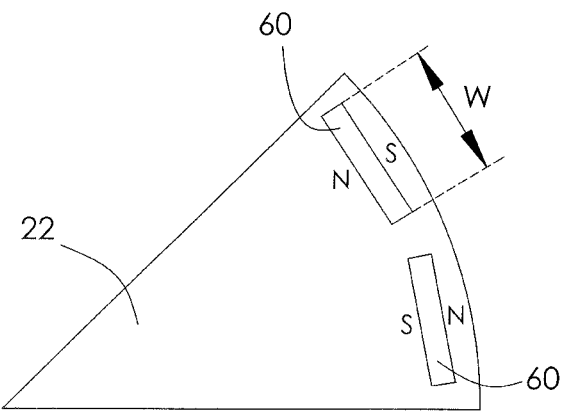
FIG. 9 illustrates a rotor core and magnets of a brushless motor according to fourth embodiment of the present invention.

FIG. 9 illustrates a part of a rotor core of a brushless motor according to another embodiment. In this embodiment, each magnetic pole is formed by a single magnet 60 inserted into the rotor core. Effective dimension W of each magnetic pole is defined as the distance between two axially extending edges of the magnet 60, and the two axially extending edges are farther away from the rotor shaft than other axially extending edges.

It is thought that flux leakage is reduced because the circumferential width of the stator poles and the rotor poles at the air gap are approximately equal allowing or causing the flux path to be more focused with less opportunity for leakage.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A brushless motor, comprising:
a stator comprising a stator core and windings, the stator core comprising a plurality of salient poles each of which extends inwardly, the windings being wound about the salient poles; and
a rotor comprising a shaft, a rotor core fixed onto the shaft, and magnets fixed in the rotor core to form four magnetic poles, the rotor being rotatably mounted to the stator,
wherein each of the salient poles comprises a pole shoe extending along a circumferential direction of the rotor and having a pole face confronting the rotor core and being spaced from the rotor core by an air gap;
wherein each of the magnetic poles is formed by a plurality of permanent magnets inserted in the rotor core and arranged at least in an inner layer and an outer layer, the inner layer is closer to the shaft than the outer layer, the permanent magnets in the inner layer are spaced from the permanent magnets in the outer layer;
wherein for each of the magnetic poles, the permanent magnets in the outer layer consists of two permanent magnets forming a "V" open outwardly in a cross section of the rotor core, and the permanent magnets in the inner layer comprises three permanent magnets forming a truncated "V" open outwardly in a cross section of the rotor core;
wherein each of the magnetic poles comprises a pair of first permanent magnets and a second permanent magnet in the inner layer, the first permanent magnets in the inner layer are respectively located at two circumferential sides of the magnetic pole in radial directions of the rotor core and is shared mutually by two adjacent magnetic poles, and the second permanent magnet extends between radially inner ends of the pair of first permanent magnets in the inner layer;
wherein the second permanent magnets have a thickness equal to a thickness of each of the pair of first permanent magnets in the inner layer; and
wherein the second permanent magnets of the four magnetic poles are respectively located at four sides of a square.

2. The brushless motor of claim 1, wherein an interval between two adjacent pole shoes is equal to or larger than three times the radial thickness of the air gap.

3. The brushless motor of claim 1, wherein the windings are concentrated windings.

4. The brushless motor of claim 1, wherein the ratio of the number of salient poles to the number of magnetic poles is 3:2.

5. The brushless motor of claim 1, wherein in a radial cross section of the motor, each of the magnetic poles of the rotor has an effective dimension which is 0.85 times to 1.2 times of the chord length of each pole face.

6. The brushless motor of claim 1, wherein a distance between the radially outer end of a magnet in the outer layer and an adjacent shared magnet in the inner layer is substantially equal to a distance between the radially inner end of the magnet in the outer layer and the magnet between the two shared magnets in the inner layer.

7. The brushless motor of claim 1, wherein the rotor core forms a plurality of first grooves for receiving the permanent magnets in the outer layer, and a plurality of second grooves for receiving the permanent magnets in the inner layer, and wherein each of the first grooves is partially open at its radial outer end and each of the second grooves is closed at its radial outer end.

8. A brushless motor, comprising:
a stator comprising a stator core and a plurality of windings wound on the stator core; and
a rotor rotatably mounted in the stator and comprising a shaft, a rotor core fixed onto the shaft, and a plurality of permanent magnets fixed in the rotor core and forming four magnetic poles of the rotor,
wherein:
the plurality of permanent magnets comprises:
four first magnets located at four sides of a square and charged radially with respect to the rotor; and
four sets of second magnets surrounding the square, equally spaced in a circumferential direction of the rotor, and charged circumferentially with respect to the rotor,
wherein each of the four sets of second magnets consists of a central second magnet located at an extension line of a corresponding diagonal of the square, and two side second magnets symmetrically arranged about the central second magnet;
wherein each central second magnet has a thickness equal to a thickness of each first permanent magnet.

9. The brushless motor of claim 8, wherein a distance between the two side second magnets of each set of second magnets gradually increases from a radial outer portion to a radial inner portion of the rotor core.

10. The brushless motor of claim 8, wherein the rotor core comprises:
a plurality of first grooves for receiving the central second magnets of the four sets of second magnets, at least one of the plurality of first grooves having a closed radial outer end; and
a plurality of second grooves for receiving the side second magnets of the four sets of second magnets, at least one of the plurality of second grooves having a partially open radial outer end.

11. The brushless motor of claim 8, wherein:
the central second magnet and the two side magnets of a first set of the four sets of second magnets are charged in a first circumferential direction; and
the central second magnet and the two side magnets of a second set of the four sets of second magnets adjacent the first set are charged in a second circumferential direction opposite to the first circumferential direction.

12. The brushless motor of claim 11, wherein:
the central second magnet and the two side magnets of a third set of the four sets of second magnets adjacent the second set are charged in the first circumferential direction; and
the central second magnet and the two side magnets of a fourth set of the four sets of second magnets adjacent the third set are charged in the second circumferential direction.

* * * * *